United States Patent [19]
Funk

[11] Patent Number: 5,845,133
[45] Date of Patent: Dec. 1, 1998

[54] VIRTUALIZED FUNCTIONS WITHIN A MICROPROCESSOR

[75] Inventor: Andrew D. Funk, Longmont, Colo.

[73] Assignee: Cyrix Corporation, Richardson, Tex.

[21] Appl. No.: 498,965

[22] Filed: Jul. 6, 1995

[51] Int. Cl.$^6$ .................................................. G06F 9/46
[52] U.S. Cl. ........................................ 395/741; 395/733
[58] Field of Search ................................. 395/741, 733

[56] References Cited

U.S. PATENT DOCUMENTS

| | | | |
|---|---|---|---|
| 4,514,805 | 4/1985 | McDonough et al. | 395/734 |
| 4,812,975 | 3/1989 | Adachi et al. | 395/500 |
| 4,885,681 | 12/1989 | Umeno et al. | 395/821 |
| 5,155,838 | 10/1992 | Kishi | 395/500 |
| 5,175,853 | 12/1992 | Kardach et al. | 395/650 |
| 5,560,002 | 9/1996 | Kardach et al. | 395/550 |
| 5,590,312 | 12/1996 | Marisetty | 395/500 |

OTHER PUBLICATIONS

Chips and Technologies, Inc., CHIPSystem Architecture, "The SuperState Architecture", Oct. 1991, pp. 15–25.

*Primary Examiner*—Jack B. Harvey
*Assistant Examiner*—David A. Wiley
*Attorney, Agent, or Firm*—Andrew S. Viger; John L. Maxin

[57] ABSTRACT

A system and method for virtualizing external pins and their internal functions within a microprocessor employing an operating system independent interrupt and N subhandlers to virtual the equivalent functions of the pins ordinarily performed by extrinsic circuitry internal to the microprocessor.

17 Claims, 2 Drawing Sheets

VIRTUALIZED FUNCTIONS WITHIN A MICROPROCESSOR

BACKGROUND OF THE INVENTION

1. Field of the Invention

The invention relates generally to complex integrated circuits, and more particularly, to a system and method within a microprocessor, for virtualizing circuitry which was employed to perform functions responsive to external input pins.

2. Description of Related Art

As integrated circuits become increasingly more complex, such as, for example, a complex microprocessor, the required interconnections with the outside world have increased to a point where package size and peripheral bond pad widths are nearing theoretical limits. This phenomenon is sometimes referred to as "pad-width limited." Accordingly, integrated circuit designers and packaging engineers have had, up until now, three choices, namely: (a) eliminate certain interconnections, (b) accept larger dies/packages, or c) use non-standard die attach methods—none of which is entirely acceptable. Doing without interconnections compromises flexibility and functionality, providing larger die/packages increases cost as well as takes up printed circuit board (motherboard) space, and using non-standard die methods are extremely costly.

A related, but not entirely relevant technique to the present invention is the SuperState™ mode of operation described in the *Product Briefs for the CHIPSystem™ Architecture*, dated October 1991, by Chips and Technologies, Inc., of San Jose, Calif. In this so-called "SuperState™ mode", software and hardware incompatibilities are reconciled by intercepting or "trapping" incompatible software commands or interrupts and translating them into a compatible format This "SuperState™ mode", however, is completely devoid of any teachings or suggestions for virtualizing circuitry used to perform preexisting external pin functions.

Accordingly, it can be seen that to minimize packaging and die size, there is a need to reduce pin count by virtualizing external pins and their internal functions within a complex integrated circuit, such as a microprocessor.

SUMMARY OF THE INVENTION

To overcome the limitations of the prior art described above, and to overcome other limitations that will become apparent upon reading and understanding the present specification, the present invention discloses a system and method of virtualizing external pins and their internal functions within a native central processing unit, which are normally provided with extrinsic circuitry, by employing a high priority interrupt within a system management mode, for trapping and servicing events. A plurality of predefined input pins which are normally coupled to the native central processing unit, are coupled instead to system logic which generates a single System Management Interrupt (SMI). In response to the single SMI, the native central processing unit determines the source or "event" that caused the interrupt and performs its equivalent function without the aid of extrinsic circuitry. Additionally, the native central processing unit need not internally register events occurring in system logic since a single SMI can be used to service all events at one time.

A feature of the present invention is a high degree of integration and amortization of native central processing unit bandwidth to run both application software and to virtualize external pins and their internal functions.

Another feature of the present invention is direct efficiency dependency of the virtualized external pins and their internal functions on the speed of the native central processing unit.

Another feature of the present invention is that virtualized external pins and their internal functions are independent of the operating system.

Another feature of the present invention is that virtualized external pins and their internal functions do not require any special memory management handlers.

Another feature of the present invention is the ease of upgrading new programming for virtualized pins and their internal functions.

Another feature of the present invention is minimal impact on the manufacturing cost of the computer system.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a system and method of virtualizing pins and their internal functions, practiced in accordance with the principles of the present invention.

DESCRIPTION OF THE PREFERRED EMBODIMENT

Figure 1:
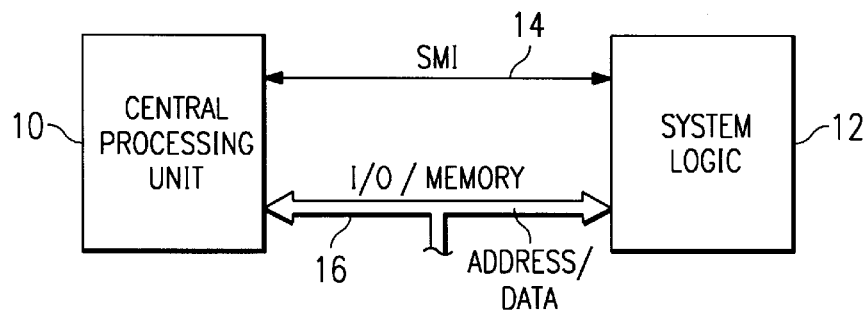
FIG. 1 is a general block diagram of a system practiced in accordance with the principles of the present invention.

The detailed description of the preferred embodiment for the present invention is organized as follows:

1. System Employing Virtualized Functions Within A Microprocessor
2. Process Flow For Virtualized Pins and Their Internal Functions
3. Specific Examples Of Virtualized Pins
   3.1 A20M# Pin
   3.2 IGNNE# Pin
4. Conclusion This organizational table, and the corresponding headings used in this detailed description, are provided for the convenience of reference only and are not intended to limit the scope of the present invention.

It is to be understood that while the preferred embodiment is described hereinbelow with respect to the x86 computer architecture, it has generally applicability to any architecture. Certain terminology related to the x86 computer architecture (such as register names, signal nomenclature, etc.) which are known to practitioners in the field of microprocessor design, are not discussed in detail in order not to obscure the disclosure.

Moreover, structural details which will be readily apparent to those skilled in the art having the benefit of the description herein have been illustrated in the drawings by readily understandable block representations and flow diagrams, showing and describing details that are pertinent to the present invention. Thus, the block and flow diagram illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

1. System Employing Virtualized Functions Within A Microprocessor

Reference is now made to FIG. 1 which depicts a general block diagram of a system practiced in accordance with the principles of the present invention. A CPU 10 is coupled to system logic 12 (a.k.a. chipset logic) by a System Management Interrupt (SMI) line 14 and an I/O and memory address/data bus 16. When pulled logically low, the SMI line 14 invokes the highest priority—nonmaskable—operating system independent—interrupt handler. The SMI interrupt handler may also be preferably invoked through executable software instructions. While any and all SMI techniques are contemplated for use with the present invention, the currently preferred mechanism for handling SMI is disclosed in pending U.S. patent application Ser. No: 08/388,127, filed Mar. 09,1995, entitled "Enhanced System Management Method And Apparatus With Added Functionality", which is a file-wrapper-continuation of U.S. patent application Ser. No: 08/062,014, which is a continuation-in-part application of U.S. patent application Ser. No: 07/900,052, filed Jun. 17, 1992, all assigned to the Assignee of the present invention, and all herein incorporated by reference.

The SMI interrupt handler (discussed in more detail hereinbelow) determines the external source (cause) of the SMI line 14 being pulled low by reading a memory or I/O mapped address over bus 16. In some instances however, such as for example, in the IGNNE# pin, the source of the SMI may be determined by reading a status register internal to the central processing unit.

2. Process Flow For Virtualized Pins and Internal Functions

Figure 2:
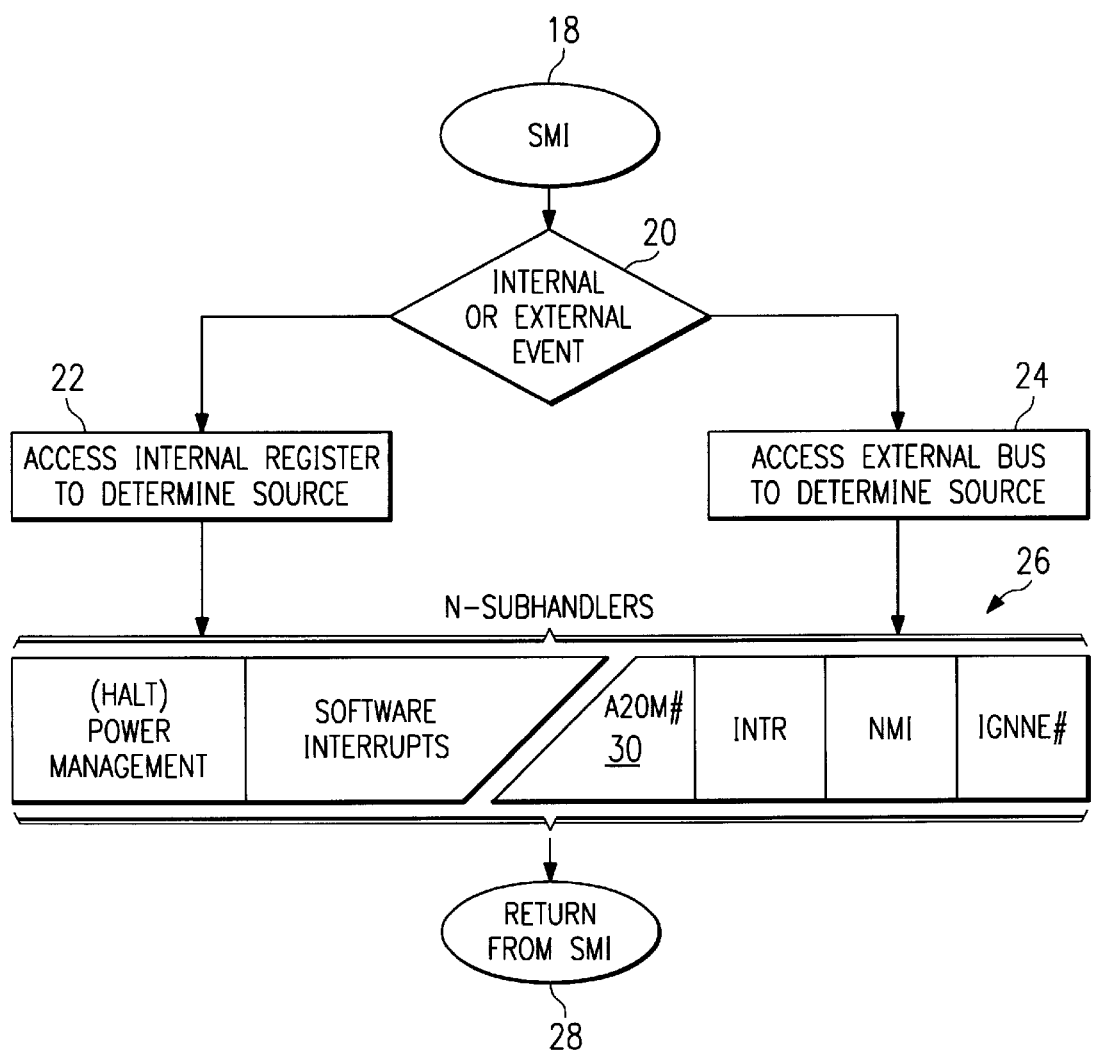
FIG. 2 is a general flow diagram of a process practiced in accordance with the principles of the present invention.

Reference is now made to FIG. 2 which depicts a general flow diagram of a process practiced in accordance with the principles of the present invention. At step 18, an event (i.e. assertion of a pin to the system logic 12, an event independently within the system logic 12, or an event/particular cycle occurring on the I/O memory bus 16), causes the assertion of the SMI line 14 which invokes the SMI handler. At step 20, the SMI handler determines whether the event that caused the SMI is internal or external to the CPU 10. If the event is external, step 24 performs an external bus cycle or in some cases, an internal status read is performed at step 22, to determine the source of the SMI. The external bus cycle is preferably, although not exclusively, a read to I/O or memory space over address/data bus 16. At step 26, one-of-N SMI subhandlers (discussed in more detail hereinbelow) is executed to virtualize the function of the event which invoked the SMI handler. At step 28, the CPU 10 returns from the SMI handler to the state from which it was invoked.

3. Specific Examples Of Virtualized Pins

The following subsections 3.1–3.2 detail steps for virtualizing several of many specific pins within an x86 microprocessor. It should be understood that the present invention is neither limited to the x86 architecture nor the particular functions described. Those skilled in the art will recognize, with the aid of the present disclosure and with reference to the *Cx486DX/DX2*™*3 and 5 Volt Microprocessor Data Book*, dated March 1994, by the Cyrix Corporation of Richardson, Tex., herein incorporated by reference, other virtualized pins without departing from the scope of the present invention.

3.1 A20M# Pin

One example of a virtualized pin in the context of the x86 architecture is the A20M# input The A20M# input is an active low address bit 20 mask, typically generated by the system logic 12, which causes the CPU 10 to mask (force low) physical address bit 20 when driving the external address bus or when performing an internal cache access. Assertion of the A20M# input pin serves to emulate the one megabyte address wrap-around that occurs on the 8086 microprocessor.

In accordance with the principles of the present invention, no separate A20M# input pin is provided to the CPU 10 nor is there any extrinsic circuitry in the CPU 10 to perform the function of A20M#. Rather, the A20M# input along with other "CPU" inputs, one of which is discussed hereinbelow, are coupled directly to the system logic 12. The system logic 12, responsive to one or more of the inputs going active, pulls the SMI line 14 active low. The CPU 10 in turn queries the system logic 12, as discussed above, for the cause of the SMI.

Figure 3:
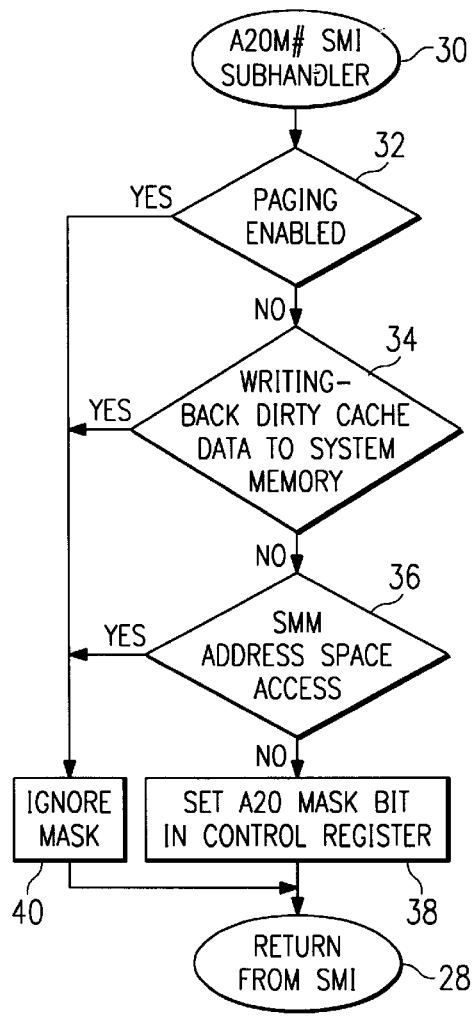
FIG. 3 is a detailed flow diagram of an exemplary process that virtualizes the function of an A20M# pin in the x86 architecture; and, FIG. 4 is a detailed flow diagram of an exemplary process that virtualizes the function of an IGNNE# pin in the x86 architecture.

Reference is now made to FIG. 3 which depicts the SMI subhandler 30 for the A20M# pin. In the preferred embodiment, the system logic 12, generates an SMM request on SMI line 14 responsive to the A20M# pin going active (low). SMI subhandler 30 determines at step 32 whether paging is enabled. If so, step 40 (ignore mask function) is performed. Otherwise SMI subhandler 30 determines at step 34 whether the CPU 10 is writing-back dirty cache data to system memory. If so, step 40 (ignore mask function) is performed. Otherwise SMI subhandler 30 determines at step 36 whether the CPU 10 is accessing SMM address space. If so, step 40 (ignore mask function) is performed. Otherwise, step 38 is performed which sets an A20 mask bit in a control register. Consequently, subsequent generation of addresses by the CPU 10 force address bit 20 to zero causing an address wrap-around on one megabyte boundaries.

3.2 IGNNE# Pin

Another example of a virtualized pin in the context of the x86 architecture is the IGNNE# input. The IGNNE# input is active low typically generated by the system logic 12, which forces the CPU 10 to ignore any pending unmasked floating point unit (FPU) errors and allows continued execution of floating point instructions. When the IGNNE# input is not asserted and an unmasked FPU error is pending, the CPU 10 will execute only selected floating point instructions.

In accordance with the principles of the present invention, no separate IGNNE# input pin is provided to the CPU 10 nor is there any extrinsic circuitry in the CPU 10 to perform the function of IGNNE#. Rather, the IGNNE# input is coupled directly to the system logic 12. The system logic 12, responsive to an FPU exception, pulls the SMI line 14 active low. The CPU 10 in turn queries the system logic 12, as discussed above, for the cause of the SMI.

Figure 4:
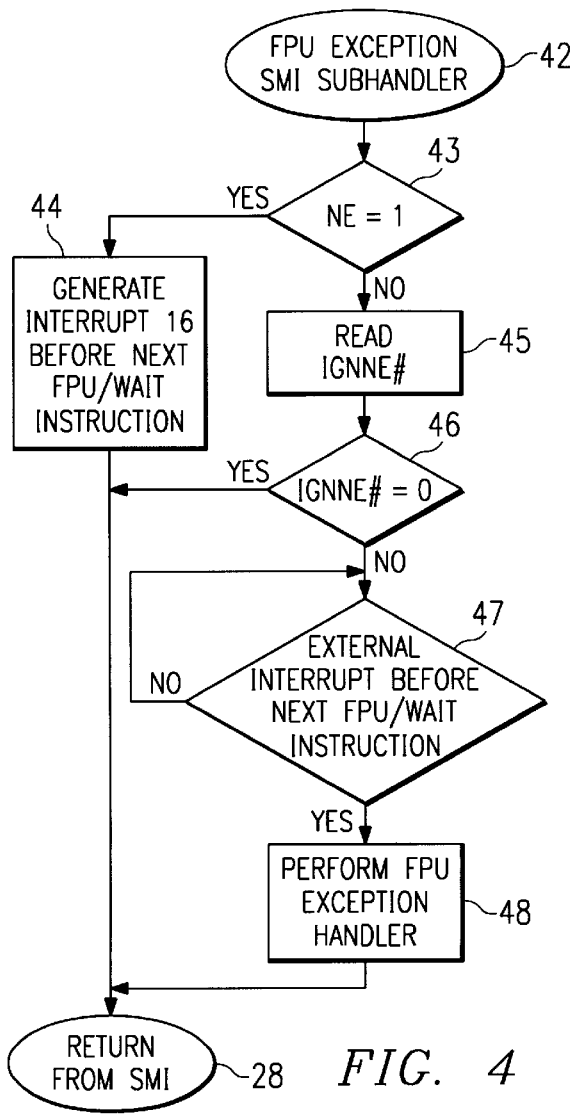

Reference is now made to FIG. 4 which depicts an SMI subhandler 42 for the FPU exception (IGNNE#) pin. In the preferred embodiment, the system logic 12, generates an SMM request on SMI line 14 responsive to an FPU exception. FPU exception SMI subhandler 42 determines at step 43 whether the numeric exception (NE) bit in control register zero (CR0) is set If so, step 44 is performed which generates interrupt 16 before execution of the next FPU/WAIT instruction. Otherwise, SMI subhandler 42 reads the IGNNE# bit at step 45 and determines at step 46 whether IGNNE# is active low. If so, the remaining steps are ignored and the subhandler returns from the SMI handler at step 28. Otherwise at step 47, the subhandler 42 waits for an external interrupt which identifies the FPU exception handler before executing the next FPU/WAIT instruction. In response to the external interrupt, the FPU exception handler is performed at step 48 and control is returned at step 28.

4. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the claims.

What is claimed is:

1. A processing system that virtualizes functions within a microprocessor comprising:
   (a) a microprocessor;
   (b) system logic coupled to the microprocessor with a system management interrupt line and an address/data bus; and,
   (c) a system management handler, responsive to the system management interrupt line being asserted, wherein the system management interrupt line is asserted responsive to a source that is external to the microprocessor and which occurs asynchronous to instructions being executed in the microprocessor, to identify the source of the system management interrupt line being asserted, and to perform an equivalent function ordinarily performed by dedicated circuitry internal to the microprocessor.

2. A processing system as recited in claim 1 further comprising at least one input pin coupled to the system logic (b).

3. A processing system as recited in claim 2 wherein the source of the system management interrupt line being asserted is the at least one input pin.

4. A processing system as recited in claim 1 wherein the system management handler (c) identifies the source of the system management interrupt line being asserted by performing an external bus cycle to read the system logic.

5. A processing system as recited in claim 3 wherein the microprocessor has an x86 architecture and the at least one input pin is an A20M# pin.

6. A processing system as recited in claim 3 wherein the microprocessor has an x86 architecture and the at least one input pin is an IGNNE# pin.

7. A processing system as recited in claim 1 wherein the system management handler (c) identifies the source of the system management interrupt line being asserted by reading an internal register within the microprocessor.

8. A processing system for virtualizing functions within a microprocessor comprising:
   (a) processing means for executing machine code;
   (b) system logic means, coupled to the processing means, for generating an operating system independent interrupt, wherein the operating system independent interrupt is asserted responsive to a source that is external to the processing means and which occurs asynchronous to instructions being processed in the processing means; and,
   (c) system management handler means, responsive to the system logic means, for identifying the source of the operating system independent interrupt and for performing an equivalent function ordinarily associated with assertion of the source of the operating system independent interrupt, with dedicated circuitry internal to the processing means.

9. A processing system as recited in claim 8 further comprising at least one input pin coupled to the system logic means (b).

10. A processing system as recited in claim 8 wherein the system management handler means (c) identifies the source of the operating system independent interrupt by performing an external bus cycle to read the system logic means.

11. A processing system as recited in claim 9 wherein the processing means has an x86 architecture and the at least one input pin is an A20M# pin.

12. A processing system as recited in claim 9 wherein the processing means has an x86 architecture and the at least one input pin is an IGNNE# pin.

13. A processing system as recited in claim 8 wherein the system management handler means (c) identifies the source of the operating system independent interrupt being asserted by reading an internal register within the processing means.

14. A method to virtualize functions within a microprocessor comprising the steps of:
   (a) receiving an operating system independent interrupt that is caused by a source that is external to the microprocessor and which occurs asynchronous to instructions being executed in the microprocessor;
   (b) querying the source in step (a) for an identity; and,
   (c) performing an equivalent function of the source identified in step (b) ordinarily performed by dedicated circuitry internal to the microprocessor.

15. A method as recited in claim 14 wherein the source is an assertion of an external pin.

16. A method as recited in claim 14 wherein step (b) is further defined by performing an external bus cycle to determine the identity of the source.

17. A method as recited in claim 14 wherein step (c) is further defined by performing a series of steps in a system management interrupt handler.

* * * * *